United States Patent [19]

Greenwell et al.

[11] 4,052,649
[45] Oct. 4, 1977

[54] HAND HELD VARIABLE SPEED DRILL MOTOR AND CONTROL SYSTEM THEREFOR

[75] Inventors: Jack E. Greenwell; Alexander Prokop, both of Reno, Nev.

[73] Assignee: Lear Motors Corporation

[21] Appl. No.: 588,010

[22] Filed: June 18, 1975

[51] Int. Cl.² ............................................. H02P 3/24
[52] U.S. Cl. ................................... 318/212; 318/230; 318/231; 32/DIG. 8
[58] Field of Search ............... 318/227, 230, 231, 212; 32/DIG. 8

[56] References Cited
U.S. PATENT DOCUMENTS

| | | |
|---|---|---|
| 1,189,184 | 6/1916 | Whiteside ........................ 32/DIG. 8 |
| 2,242,812 | 5/1941 | Brown ................................... 318/212 |
| 3,281,645 | 10/1966 | Spink ....................................... 321/47 |
| 3,355,654 | 11/1967 | Risberg ................................... 321/44 |
| 3,365,638 | 1/1968 | Risberg ................................. 318/231 |
| 3,416,057 | 12/1968 | Froyd et al. ...................... 318/231 X |

Primary Examiner—Robert K. Schaefer
Assistant Examiner—Morris Ginsburg

Attorney, Agent, or Firm—Jackson & Jones Law Corporation

[57] ABSTRACT

A high speed hand held polyphase motor and a control system therefor is disclosed. The motor is of the induction type, designed for use in oral surgery and the like. The control system includes a bridge type inverter having a separate pair of solid state switching devices such as transistors connected in a bridge configuration across a pair of direct current power supply conductors for each phase winding of the motor. A switch control circuit is connected between the solid state switches and a variable frequency clock signal generator for turning the switches of each pair on and off in a given phase sequence to provide three phase current for the motor windings. The speed of the motor is proportional to the clock signal frequency. A voltage regulating circuit is connected between the power supply conductors and a source of direct current voltage to supply a direct current voltage across the supply conductors which varies in accordance with the clock signal frequency over a pre-established range. The control system further includes a torque demand adjustment circuit coupled to the voltage regulating circuit to permit the voltage across the supply conductors to be independently adjusted over a preset range of clock signal frequency.

21 Claims, 10 Drawing Figures

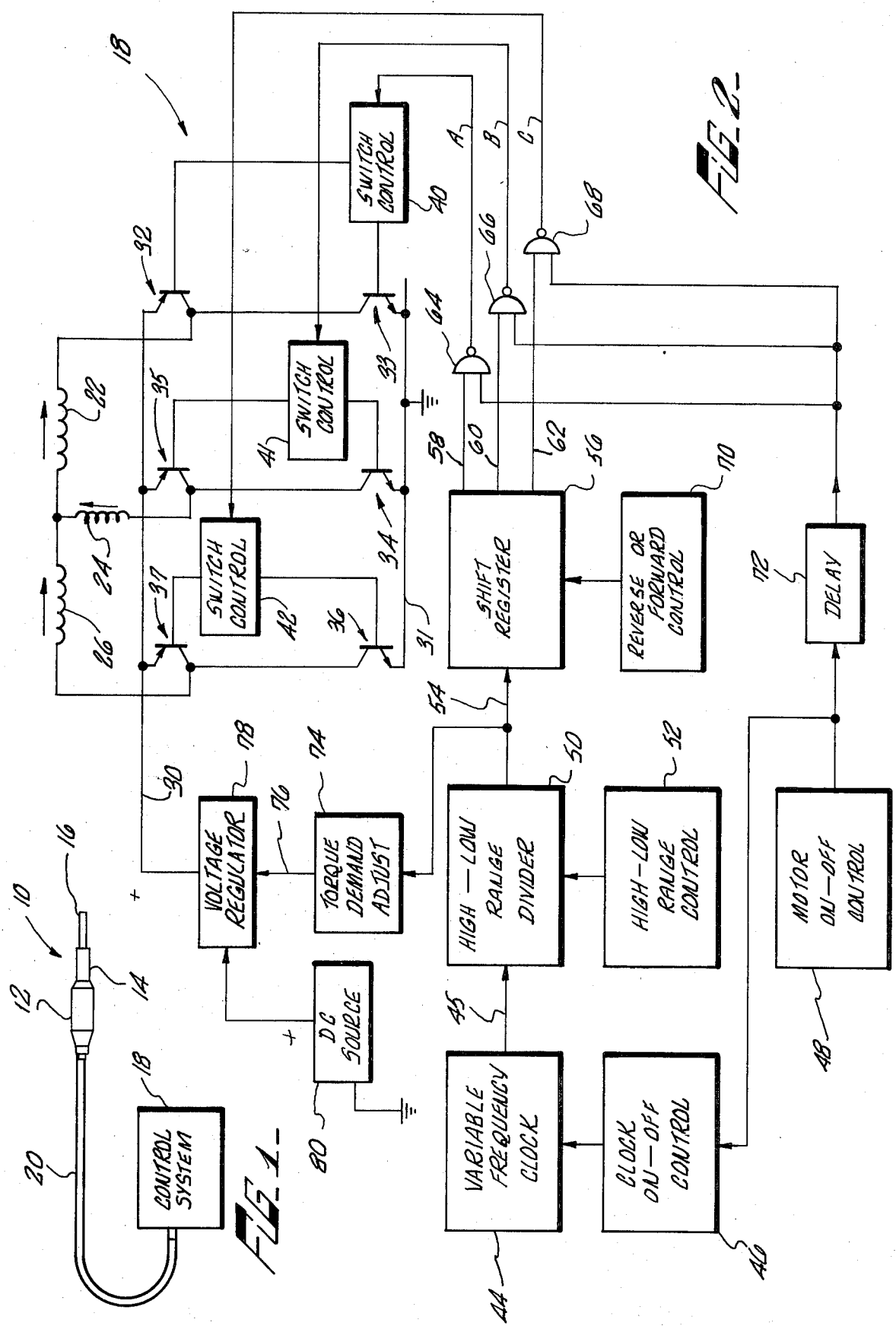

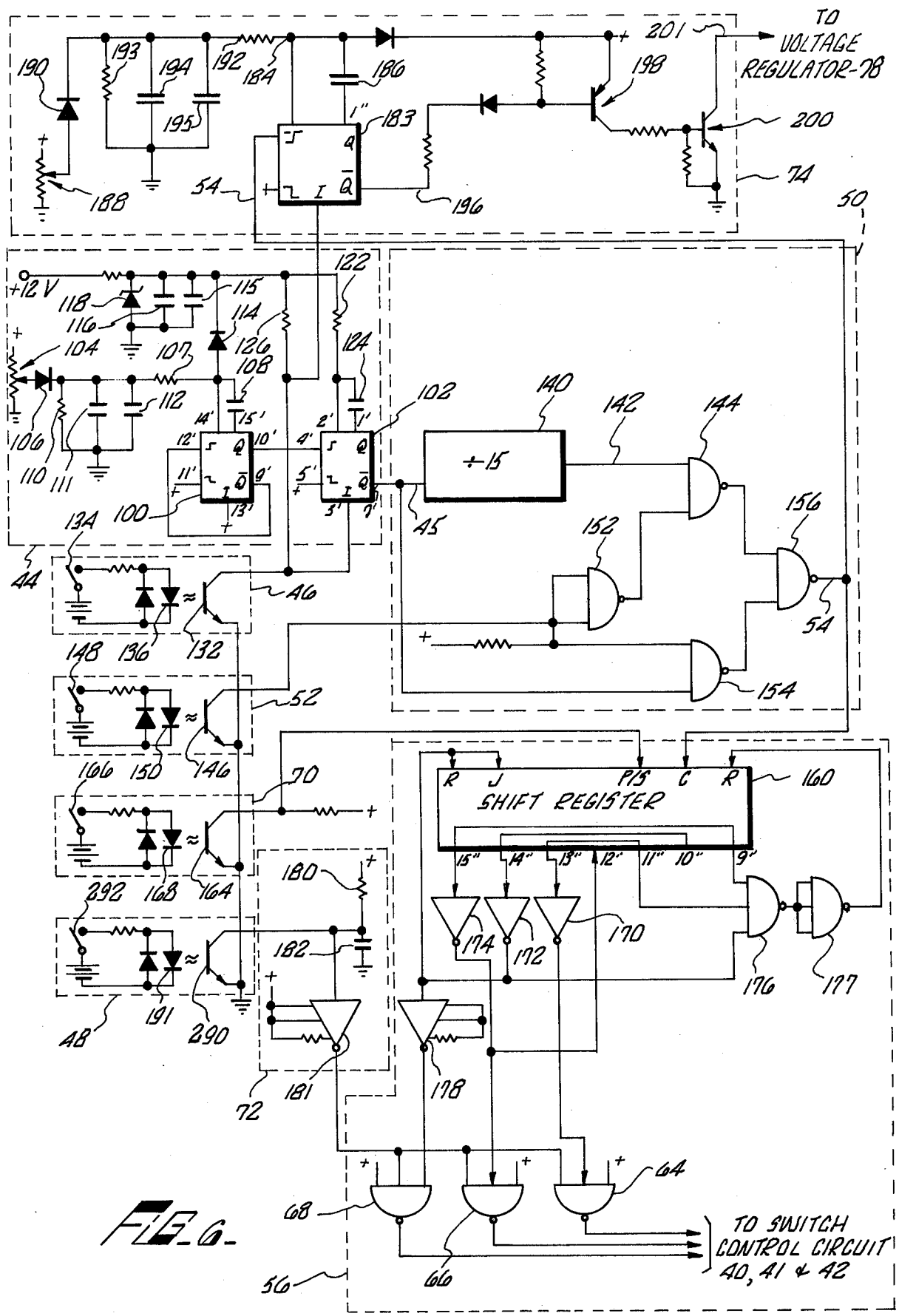
FIG_6.

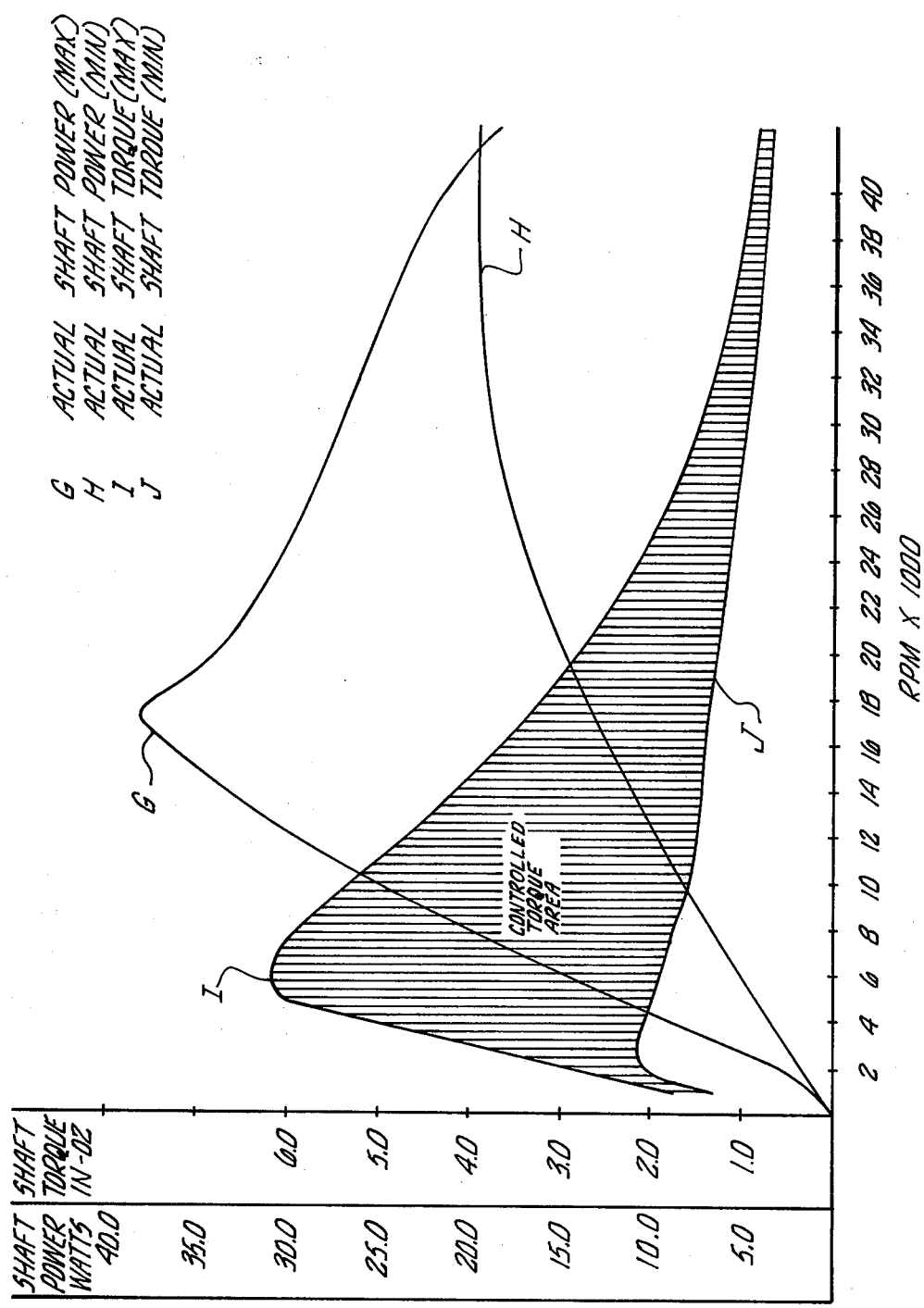

HAND HELD VARIABLE SPEED DRILL MOTOR AND CONTROL SYSTEM THEREFOR

BACKGROUND OF THE INVENTION

1. Field of the Invention

The present invention relates to small hand held motors and more particularly, to a hand held drill motor for use by dentists, surgeons, etc., and a control system therefor.

2. Description of the Prior Art

Drill motors for use by dentists and surgeons must be small enough to be carried in the doctor's hand. Such motors must have a variable speed and a high maximum speed capability. It is highly desirable that such motors also have the capability of stopping in a brief time interval to permit the quick substitution of drills or other tools. Sterilization of the motor as well as the drilling tools is also a requirement in many applications.

In the past, motors for use in dental and surgical drills have generally been of the pneumatic or electric d.c. (brush)type. Both the pneumatic and d.c. motors have variable speed capability with the pneumatic motors having a capability of a higher maximum speed than the d.c. motors. Pneumatic motors can be readily sterilized by autoclaving, that is, exposing the entire motors to a high temperature steam, for example, 150° C. D.C. motors on the other hand are generally not designed to withstand autoclaving. Pneumatic motors must have a source of air or other fluid under pressure while d.c. motors can operate from the readily available source of alternating current with an appropriate power supply system. The prior art hand held motors do not have an independent speed and torque control.

Many problems inherent in the prior art hand held motors have been overcome by the present invention which provides a high torque, light weight variable speed motor which may be readily autoclaved. The speed and torque characteristics of the motor may be independently controlled over certain speed ranges and the motor may be stopped very quickly to permit the substitution of tools. The motor of the present invention has a long life and is also more highly resistant to the environment encountered in dentistry and surgical work.

SUMMARY OF THE INVENTION

In accordance with the present invention, a hand-held dental or surgical drill tool includes a polyphase induction motor with a chuck carried by the rotor for holding the drill or other cutting or polishing tool. The motor is supplied power by means of an inverter connected across a pair of direct current supply conductors. The inverter includes a separate pair of switching devices such as transistors connected across the supply conductors for each phase winding of the motor. A junction intermediate each pair of switching devices is connected to a respective phase winding of the motor. Switch control means is coupled between a variable frequency clock signal generator and the switching devices for alternately rendering one switching device of each pair conducting, and the other switching device of each pair non-conducting in a predetermined phase sequence to provide a three-phase current for the motor windings to cause the motor to rotate at a speed proportional to the clock signal frequency. The power supply control system further includes voltage regulating means connected between a source of direct current and the supply conductors. The voltage regulating means is responsive to the clock signal for supplying a direct current voltage across the supply conductors which varies in accordance with the clock signal frequency over a pre-established range. The power supply control system may further include a torque demand adjustment means coupled to the voltage regulating means to vary the voltage across the supply conductors independently of the clock signal frequency over a preset range.

BRIEF DESCRIPTION OF THE DRAWINGS

FIG. 1 is a block diagram of a hand-held electric drill and a control system therefor in accordance with the present invention;

FIG. 2 is a block diagram illustrating the several components of the power supply control system for the motor of FIG. 1;

FIG. 5 is a graph of the output voltage of the voltage regulator of FIG. 2 as a function of the clock signal frequency and the setting of the torque demand adjustment circuit;

FIG. 10 is a graph illustrating the horsepower and torque characteristics of the motor of FIG. 1 as a function of speed.

DESCRIPTION OF THE PREFERRED EMBODIMENT

Figure 4:
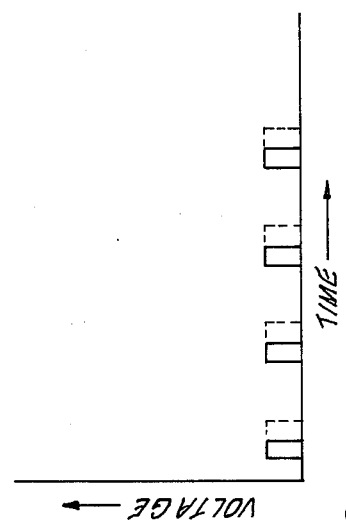
FIG. 4 is a graph of the voltage wave forms applied across the motor windings by the circuit of FIG. 2.

Referring now to FIG. 1, there is illustrated a hand-held drill 10 for use, for example, in the dental or surgical field. The drill 10 includes an electric motor 12 of a conventional polyphase induction type having a horsepower rating preferably in the range of one-fortieth to one-tenth horsepower. The rotor of the motor 12 carries a chuck 14 which in turn releasably secures a drilling, cutting or polishing tool 16. A power supply control system 18 is connected to the stator windings of the motor 12 by means of a suitable cable 20.

Referring now to FIG. 2, the various components of the power supply control system 18 are illustrated for supplying three-phase current to the stator windings 22, 24 and 26 of the motor 12. The motor windings are illustrated as being connected in a conventional Y configuration.

A three-phase bridge type inverter 18 is connected across a pair of direct current power supply conductors 30 and 31. The inverter includes three pairs of solid state switching devices, illustrated as transistors 32, 33, 34, 35, 36 and 37, connected as shown across the conductors 30 and 31. A junction intermediate each pair of switching transistors is connected to respective phase windings of the motor as shown. A separate switch control circuit is connected to the base or control electrodes of each pair of switching transistors to alternately turn one transistor on and the other transistor off and vice versa. The switch control circuits are referenced by the numerals 40, 41 and 42.

A variable frequency clock signal generator 44 provides clock signals on output line 45. The frequency of the clock signals can be varied over a wide range to provide a motor speed range of, for example, 220 to 70,000 RPM as will be described in more detail. The clock signals are in the form of positive pulses of short time duration. A clock on-off control circuit 46 is connected to the clock signal generator 44 for turning the clock on and off. The clock on-off control 46 is in turn controlled by a motor on-off control circuit 48. The clock signal is supplied to a high-low range divider network 50 to provide a separate high and low speed range for the motor. The divider 50 is controlled by a high-low range control circuit 52. The divider 50 may be arranged to pass the clock signals directly to an output line 54 to provide the high speed range and to divide the clock signals by any selected numerical value such as 10, 15, etc., to provide the low speed range. The clock signals on line 54 are applied to a shift register 56 which provides three-phase shifted output signals on output lines 58, 60 and 62 to three NAND gates 64, 66 and 68, respectively.

A forward or reverse control circuit 70 is connected to the shift register 56 to control the phase sequence of the output signals therefrom and thereby control the direction of rotation of the motor as will be described in more detail. A delay circuit 72 is connected between the NAND gates 64, 66 and 68 and the motor on-off control circuit 48 to inhibit the NAND gates a preselected time after the motor control and clock signal generator have been turned off to permit the motor to stop quickly by eddy current brake action while preventing damage to the motor windings as will be described in more detail.

A torque demand adjustment control circuit 74 is connected between the output line 54 and a control signal input 76 of a voltage regulator 78. The voltage regulator 78 is connected between a source of direct current 80 and the supply conductors 30 and 31 to control the voltage across the supply conductors in accordance with the frequency of the clock signal output from the divider 50 and the desired torque as will be explained in more detail.

Figure 3:
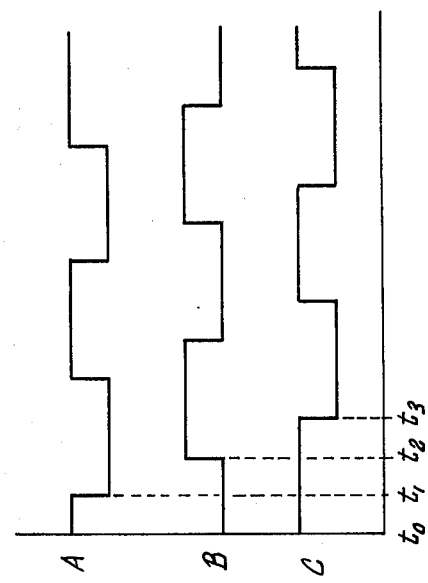
FIG. 3 is a graph of voltage wave forms taken at certain points in the circuit of FIG. 2.

Referring now to FIG. 3, the voltage waveform present at the output of NAND gates 64, 66 and 68 with the motor control circuit in the "on" position are illustrated by the curves A, B and C.

Referring now to FIG. 4, the waveforms of the voltage impressed across the motor windings 22, 24 and 26 are illustrated by curves D, E and F, respectively. During the time interval from $t_0$ to $t_1$, the switch control units 40, 41 and 42 bias transistors 32, 34 and 37 to conduction which cause current to flow through the windings 22 and 26 to the common junction Y and back through the winding 24 to ground. During the time $t_1$ and $t_2$, the transistors 33, 34 and 37 conduct, etc. As is illustrated in FIG. 4, during the time interval $t_0$ to $t_1$, the current through winding 24 is at a maximum. During the time interval $t_1$ to $t_2$ the current through winding 26 is at a maximum, and during time $t_2$ to $t_3$, the current through winding 22 is at maximum. While the waveforms illustrated in FIG. 4 are a rough approximation of a sine wave, it is obvious that these waveforms contain the third harmonic of the applied frequency. The third harmonic results in heat losses in the motor and may be removed by an appropriate filter if desired; however, in a small motor such heat losses are not of major concern.

Referring now to FIG. 5, the voltage supplied across the power supply conductors 30 and 31 as a function of clock signal frequency is illustrated. At zero clock frequency a preset voltage is supplied across the supply conductors to provide torque at low speeds. The supply voltage is increased as the clock signal frequency increases to a maximum voltage represented by the line 92. The rate at which the voltage increases as a function of clock signal frequency depends upon the setting of the torque demand adjustment circuit 74. The voltage range provided by the torque demand adjustment circuit 74 is defined by the angle $\phi$ between lines 90 and 91. At maximum torque setting the voltage will increase along the line 90 and at the minimum torque setting, the voltage will increase along the line 91 until the maximum voltage level 92 is reached. Thus, over a clock signal frequency range of $f_1$ to $f_2$, the voltage supplied to the motor may be adjusted independently of speed. For any given setting of the torque demand adjustment control, the voltage supplied to the motor via the conductors 30 and 31 will vary in a direct relation to the frequency of the clock signal over a pre-established range; i.e., from zero to the frequency at which the voltage reaches the maximum level represented by the line 92.

Figure 6:
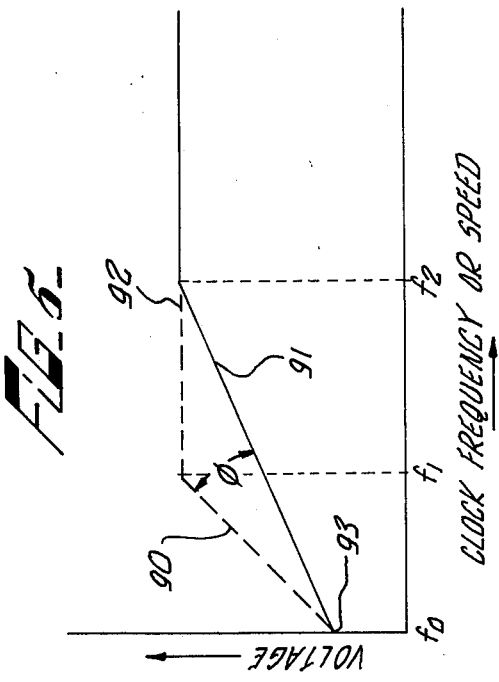
FIG. 6 is a schematic circuit diagram of certain of the components illustrated in block form in FIG. 2.

Referring now to FIG. 6, the variable frequency clock generator 44 includes a pair of multivibrators 100 and 102, which may be in the form of a single integrated circuit of the type manufactured by Motorola, Inc. as Part No. 14528CP. The multivibrators are connected as illustrated to provide a variable frequency output clock signal on line 45. The potentiometer 104 is connected between a positive bias source, for example, +12 volts and ground, with its movable tap connected to terminals 14' and 15' of the multivibrator 100 through a diode 106, a resistor 107 and a capacitor 108 as shown. The voltage level on the terminal 14' determines the frequency of the operation of the multivibrator 100. A filter circuit including a resistor 110 and capacitors 111 and 112 is connected between the diode 106 and ground as illustrated. A diode 114 is connected between the resistor 107 and the junction of a pair of filter capacitors 115 and 116. A zener diode 108 is connected between ground and a source of positive bias voltage; i.e., 12 volts to regulate the supply voltage to the integrated circuit.

The output signal from the multivibrator 100 is applied to terminal 4' of the multivibrator 102, which operates as a one-shot multivibrator to provide an output signal on line 45 of a predetermined width independently of frequency. Terminals 1' and 2' of the multivibrator 102 are connected to the positive voltage source through resistor 122 and capacitor 124 as shown. Terminal 3' of the multivibrator 102 is connected to the positive voltage source through a resistor 126. Terminal 5' of the multivibrator 102 and terminals 11' and 13' of the multivibrator 100 are also connected to a source of positive voltage to provide a high level input to these terminals.

The on-off clock control circuit 46 selectively switches the terminal 3' to ground potential through a photo-sensitive transistor 132 to thereby inhibit the multivibrator 102 and turn the clock signal generator off. A switch 134 connects a positive voltage source to a light emitting diode 136 to cause the transistor 132 to conduct. The clock signal generator 44 is turned on when the switch 134 is open.

The output signals from the clock signal generator 44 are applied to the high-low range divider network 50, which includes a divider 140, for example, of an integrated circuit type distributed by Motorola, Inc. under Part No. MC14516CP. The divider 140 may selectively divide the input signal on line 45 by an appropriate numerical value, for example, 15. The output signal from the divider 140 is applied on line 142 to an NAND gate 144. The high-low range control circuit 52 includes a photosensitive transistor 146, a switch 148 and a light emitting diode 150. When the switch 148 is closed, the transistor 146 connects the inputs of a NAND gate 152 to ground which provides high level output signal to NAND gate 144 thereby enabling NAND gate 144 to follow the output signals from the divider 140. At the same time, the conduction of transistor 146 provides a low level input to a NAND gate 154 and thereby disables NAND gate 154 from responding to the clock signal on line 45. A NAND gate 156 receives the output signals from NAND gates 144 and 154 and provides an output signal on line 54 which is; (1) the clock signal on line 45 when the switch 148 is open, and (2) the clock signal on line 142 when the switch 148 is closed.

The output signals from the high-low range divider network 50 are applied via line 54 to input of the torque demand adjustment circuit 74 and to the input of the shift register network 56. The shift register network 56 includes a four bit shift register 160 which may be of the type manufactured by Motorola, Inc. under Part No. MC14035CB. The input signals from the divider are applied to terminal C of the shift register. A high level or low level signal is applied to terminal P/S by the forward or reverse control circuit 70 which includes a photosensitive transistor 164 and a switch 166 and a light emitting diode 168. The position of the switch 166 determines the phase sequence of the output signals on terminals 13", 14", and 15".

Inverters 170, 172 and 174 receive the output signals on terminals 13", 14", and 15" of the shift register 160. A pair of NAND gates 176 and 177 are connected as illustrated to prevent the shift register from operating in undesired modes. The output signals from inverters 170 and 174 are applied to NAND gates 64 and 66, respectively. The output signal from inverter 172 is applied to NAND gate 68 through an additional inverter 178.

The on-off motor control circuit 48 is coupled through the delay circuit 72 to each of the NAND gates 64, 66 and 68 as illustrated. The on-off motor control circuit includes a photosensitive transistor 290 which grounds its collector when a switch 292 is closed to provide current flow through a light emitting diode 191. The switches 292 and 134 may be ganged to provide a single control for the motor and clock signal generator 46 as is illustrated in FIG. 2.

The delay circuit 72 includes a Schmidt trigger 181 which has its input circuit connected to a positive bias source through a resistor 180. A capacitor 182 is connected between the input of the Schmidt trigger and ground to provide a time delay circuit in conjunction with resistor 180. When the switch 292 is open, the input to the Schmidt trigger circuit will be high and provide a low output signal to each of the NAND gates 64, 66 and 68 thereby inhibiting the NAND gates. When the switch 292 is closed, the output signal from the Schmidt trigger will be high thereby enabling the NAND gates 64, 66 and 68 to follow the input signals from the inverters 170, 174 and 172. The output signals from the NAND gates 64, 66 and 68 with the motor and the clock signal generator controls on are illustrated by curves A, B and C in FIG. 3. The output signals from the NAND gates 64, 66 and 68 are supplied to the switch control circuits 40, 41 and 42 to control the operation of the inverter.

The clock signal from the high-low range divider 50 not only controls the speed of the motor by determining the frequency of the control signals supplied to the inverter but also controls the voltage supplied to the motor. To accomplish this objective, the clock signal on line 54 is applied to an input of a one-shot multivibrator 183. The multivibrator 183 may be identical to the multivibrator 102, discussed previously. The width of the output pulses from the multivibrator 183 are controlled by the magnitude of the voltage at point 184 which is connected to the multivibrator directly and through a capacitor 186 as illustrated. The voltage level at point 184 is determined by a torque demand adjustment potentiometer 188, connected between a positive potential source and ground. The center tap of the potentiometer 188 is connected through a diode 190 and a resistor 192 to the point 184 as shown. A voltage smoothing network consisting of resistor 193 and capacitors 194 and 195 are connected between the resistor 192 and ground as shown. The output signals from the multivibrator 183 on line 196 have a pulse width determined by the setting of potentiometer 188 and a frequency determined by the clock signal frequency on line 54. The output signals from the multivibrator 183 are amplified via amplifying transistors 198 and 200 and supplied to voltage regulator 78.

Figure 7:
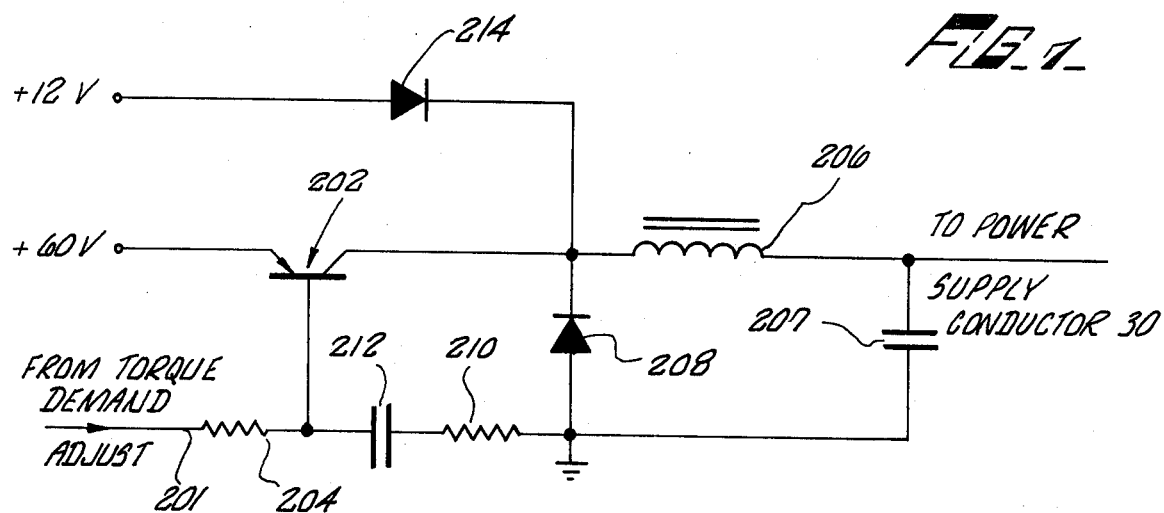
FIG. 7 is a schematic circuit diagram of the voltage regulator illustrated in block form in FIG. 2.

Referring now to FIG. 7, the voltage regulator 78 of FIG. 2 includes a voltage regulating transistor 202 having an emitter connected to a positive bias source, for example, 60 volts, and a base connected to line 201 through resistor 204. The collector of the voltage regulating transistor 202 is connected through a filter inductor 206 to the d.c. supply conductor 30. A filter capacitor 207 is connected between the conductor 206 and ground. A diode 208 is connected between the collector electrode of the transistor 202 and ground to pass reactive current and prevent reverse voltage transients from appearing across the collector base junction. A resistor 210 and capacitor 212 are connected between the base electrode of transistor 202 and ground. An offset voltage (i.e., 12 volts) is applied to the collector of the transistor 202 through a diode 214. This offset voltage provides an initial voltage across the supply conductors when the clock signal frequency is low.

The transistor 202 produces an output voltage pulse in response to each low level control pulse on line 201. The output voltage pulses are filtered to provide an output voltage level on conductor 30 which is proportional to the frequency and width of the control pulses from the torque demand adjustment circuit 74.

Figure 8:
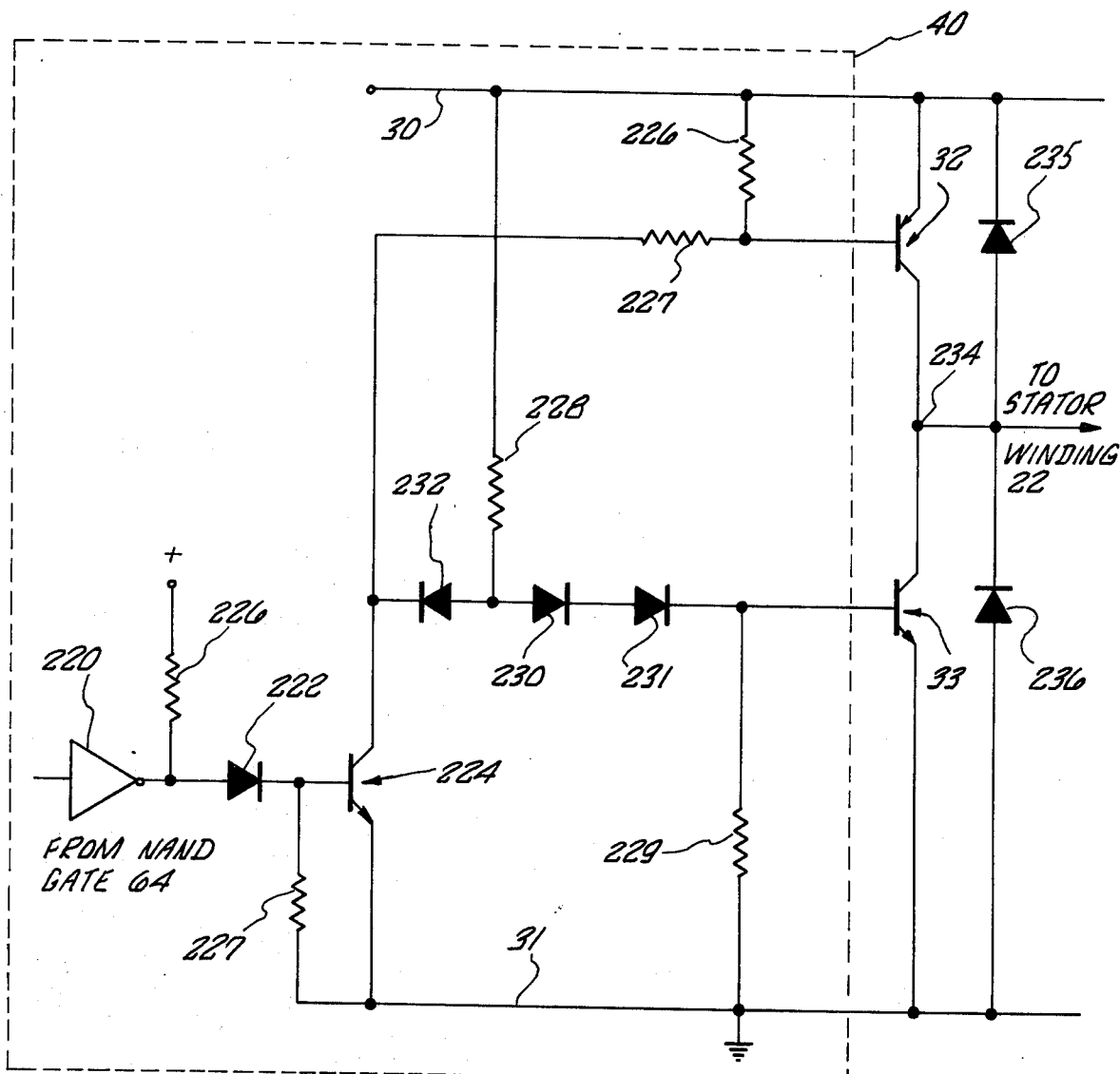
FIG. 8 is a schematic circuit diagram of one of the switch control units illustrated in block form in FIG. 2.

Referring now to FIG. 8, one of the switch control circuits 40 is illustrated. The switch control circuits 41 and 42 are identical with the control circuit 40 and, therefore, only circuit 40 is shown in detail. The switch control circuit 40 includes an inverter 220 having its output connected through a diode 222 to the base of an emitter follower transistor 224. A pair of bias resistors 226 and 227 are connected in series with the diode 222 between a source of positive potential and ground to maintain the base-emitter junction of transistor 224 forward biased in the absence of a low level (ground) input signal at the output of the inverter 220. Switching transistors 32 and 33 are connected across the supply conductors 30 and 31 as illustrated. Bias resistors 226, 227, 228 and 229 are connected in the circuit as shown to render transistor 33 conducting the transistor 32 nonconducting in the absence of a low level output signal from the inverter 220. A low level output signal from the inverter 220 (representing a high level output signal from the NAND gate 64) turns transistor 32 on and transistor 33 off. A junction 234 intermediate the transistor switches 32 and 33 is connected to the stator winding 22. A pair of protective diodes 235 and 236 are connected between the junction point 234 and the power supply conductors as illustrated to eliminate reverse voltage transients across the transistors 32 and 33.

Figure 9:
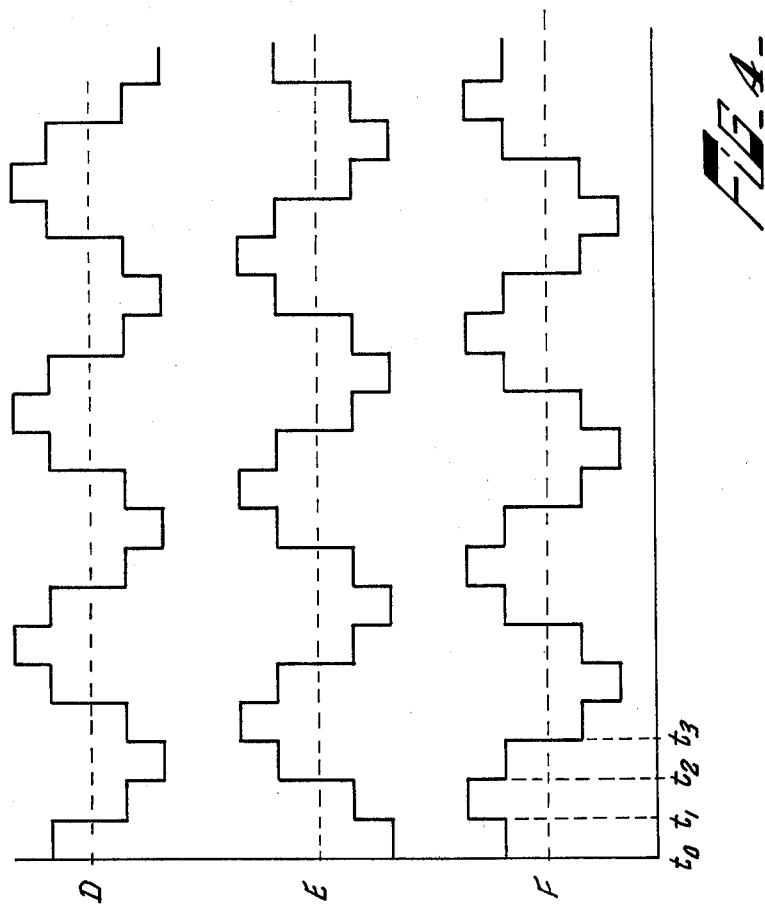
FIG. 9 is a graph illustrating the control pulses applied to the voltage regulator of FIGS. 2 and 7.

In operation, the motor control and clock signal generator circuits are turned on by opening switch 134 and closing switch 292. Clock signals are provided on line 54 which have a frequency equal to the frequency of operation of multivibrator 102 or a fraction thereof depending on whether switch 148 is closed or open to provide the high-low range operation. The NAND gates 64, 66 and 68 transmit control pulses A, B, and C of FIG. 3 to the switch control circuits 40, 41 and 42, respectively. The switching transistors 30-36 are operated in a predetermined phase sequence to provide the voltage waveforms D, E and F of FIG. 4 across the motor windings. The magnitude of voltage across the power supply conductors 30 and 31 and across the motor windings is determined by the width of the clock signal pulses and the number of pulses per second that are applied to the base of transistor 202. Referring to FIG. 9 the clock signal pulses on line 201 are illustrated with the variable width indicated by the dotted lines. The clock pulses on line 201 thus determines the frequency of operation and the duty cycle of transistor 202. The voltage pulses at the collector of transistor 202 are smoothed by inductor 206 and capacitor 207 to provide a d.c. voltage across the supply conductors which is proportional to setting of the clock frequency potentiometer 104 and the torque demand adjustment potentiometer 188. Thus, the speed of the motor may be controlled by potentiometer 104 and the torque may be increased or decreased by potentiometer 188.

When it is desired to stop the motor, i.e., to change tools, the switch 134 is closed and switch 292 is opened. This action stops the clock signal generator and the torque demand adjustment circuit by applying a low level signal to the I inputs of the one-shot multivibrators 102 and 183. The voltage regulator 78 will not receive additional control pulses on line 201 and, therefore, the supply voltage to the motor will drop to the preset voltage level shown at point 93 in FIG. 5. At this same time, the shift register 160 will stop. The NAND gates 64, 66 and 68 will continue to supply high or low level output signals as determined by the last count in register 160. The particular switching transistors 32-37 which are conducting just before the clock signal generator stopped will remain conducting and supply direct current to the motor windings. The flow of direct current through the motor windings causes the motor to function as an eddy current brake and apply a high braking torque to the rotor. This action results in stopping the motor in a very short time interval thereby permitting the quick substitution of tools, etc.

The flow of direct current through the motor windings is limited only by the d.c. resistance of the windings and, therefore, the time for this type of motor operation must be limited to prevent damage to the windings. The delay circuit 72 accomplishes this objective by causing the input signal to the Schmidt trigger 181 of FIG. 6 to remain above the trigger level after the transistor 190 is rendered conducting for a preset time interval (i.e., 2–3 seconds) as determined by the values of the resistor 180 and capacitor 182.

When the input signal to the Schmidt trigger 181 rises to the trigger level, the output of the Schmidt trigger will go low and inhibit the NAND gates 64, 66 and 68. All of the NAND gates will then provide a high level output signal which will turn switching transistors 33, 34 and 36 on and transistors 32, 35 and 37 off. This action disconnects the motor windings from the power supply conductors to prevent damage to the windings.

Referring now to FIG. 10, the torque and power characteristics of the motor are illustrated. The maximum shaft power of the motor is illustrated by curve G. The minimum power is illustrated by Curve H. Curve I represents the maximum shaft torque and curve J represents the minimum shaft torque of the motor as a function of motor RPM.

There has thus been described a new hand held brushless drill motor and control system which permits independent adjustment of the speed and torque within a range of motor speeds. The motor may be stopped in a short time interval to permit the rapid substitution of tools.

Various modifications of the preferred embodiment described herein can be made by those skilled in the art without departing from the scope and spirit of the invention. For example, the motor windings are illustrated as being connected in a Y configuration. Obviously, the windings could be connected in a Delat configuration, if desired. Transistors are illustrated as switching elements in the described inverter circuit; however, other types of switching elements, such as silicon controlled rectifiers could be used, if desired, with appropriate control circuits.

What is claimed is:

1. In a hand held dental drill and control system therefor, the combination which comprises:
   an induction motor having a three phase stationary winding and a rotor;
   a chuck carried by said rotor of the motor for releasably securing a dental drilling tool;
   a source of direct current;
   a pair of power supply conductors;
   an inverter, the inverter including a plurality of solid state switching devices connected across said power supply conductors, a junction intermediate each pair of said switching devices connected to respective phase windings of the motor;
   a variable frequency clock signal generator;
   switch control means coupled between said clock signal generator and said switching devices for alternately rendering one switching device of each pair conducting and the other switching device nonconducting in a predetermined phase sequence to provide three phase current for said stationary winding to cause the motor to rotate in a first direction at a speed proportional to the frequency of the clock signal from said clock signal generator; and
   voltage regulating means responsive to the clock signal from said clock signal generator and connected between the source of direct current and the power supply conductors for providing a direct current voltage across the supply conductors which varies in accordance with the frequency of the clock signal from said clock signal generator over a pre-established range.

2. The combination as defined in claim 1 including torque adjustment means coupled to the voltage regulating means for varying the voltage across the supply conductors independently of the frequency of the clock signal from said clock signal generator.

3. The combination as defined in claim 1 including stop control means coupled to the switch control means for maintaining one switching device for each pair conducting and the other switching device nonconducting for a preset time to provide direct current flow through said stationary winding and thereby apply a braking torque to said rotor.

4. The combination as defined in claim 3 wherein the stop control means is arranged to control the switching devices to provide an open circuit across the supply conductors after said preset time.

5. The combination as defined in claim 1 wherein the switch control means is arranged to selectively reverse the predetermined phase sequence of the switching devices to reverse the direction of the motor rotation.

6. In a motor control system for a three phase induction motor having motor windings, the combination which comprises:
- a source of direct current,
- a pair of power supply conductors,
- an inverter, the inverter including a separate pair of switching devices connected across the power supply conductors for each phase winding of the motor, a junction intermediate each pair of switching devices connected to a respective phase winding, each switching device having a conducting and a nonconducting state,
- a variable frequency clock signal generator,
- switch control means coupled between the clock signal generator and the switching devices for alternately rendering one switching device of each pair conducting and the other switching device of each pair nonconducting in a predetermined phase sequence to provide three phase current for the motor windings to cause the motor to rotate in a first direction at a speed proportional to the frequency of the clock signal from said clock signal generator, and
- voltage regulating means connected between the direct current source and the power supply conductors and responsive to the clock signal from said clock signal generator for supplying a direct current voltage across the supply conductors which varies proportionately to the frequency of the clock signal from said clock signal generator over a preestablished range.

7. The combination as defined in claim 6 wherein the voltage regulating means is arranged to supply a minimum voltage across the supply conductors independently of the frequency of the clock signal.

8. The combination as defined in claim 7 including torque adjustment control means coupled to the voltage regulating means for controlling the voltage regulating means to supply a selectively variable voltage to the supply conductors over a preset range of frequencies of the clock signal from said clock signal generator.

9. The combination as defined in claim 6 including stop control means for applying direct current to the motor windings for a preset time interval to cause the motor to operate as an eddy current brake.

10. The combination as defined in claim 9 including torque demand adjustment control means coupled to the voltage regulating means to selectively vary the voltage across the supply conductors independently of the frequency of the clock signal from said clock signal generator.

11. The combination as defined in claim 10 wherein the clock signal generator includes a high-low range network for selectively supplying clock signals within two frequency ranges to provide a high and low speed range for the motor.

12. In a variable speed hand held dental drill the combination which comprises:
- a polyphase induction motor, including phase windings and a rotor;
- a chuck carried by the rotor of said motor for releasably securing a tool;
- a pair of power supply conductors;
- means for supplying direct current at a selected voltage across the supply conductors;
- an inverter, the inverter including a plurality of pairs of switching devices connected across the power supply conductors, a junction intermediate each pair of switching devices connected to respective phase windings of said motor, each switching device having a control electrode and being arranged to provide a closed circuit between the respective power supply conductor and the associated phase winding in response to the application of a first control signal to the control electrode thereof and to provide an open circuit between the respective power supply conductor and the associated motor winding in response to the application of a second control signal to the control electrode;
- a variable frequency clock signal generator;
- switch control means coupled between said clock signal generator and the inverter for alternately applying the first and second control signals to the control electrodes of each pair of switching devices in a predetermined phase sequence to provide polyphase current to the motor windings to cause the motor to rotate in a first direction at a speed proportional to the frequency of the clock signal from said clock signal generator, and
- stop control means coupled to the switch control means for selectively controlling the switch control means to continuously apply for a preset time the first control signal to the control electrode of one switching device of each pair and the second control signal to the control electrode of the other switching device of each pair to cause direct current to flow through the phase windings to thereby apply a braking torque to said rotor.

13. The combination as defined in claim 12 wherein the means for supplying direct current voltage across the supply conductors is responsive to the clock signals to supply a voltage which varies in accordance with the frequency of the clock signals over a predetermined range.

14. The combination as defined in claim 13 wherein the means for supplying direct current voltage across the supply conductors is further arranged to permit the voltage to be varied in accordance with the desired torque independently of the frequency of the clock signal from said clock signal generator over a preset range of frequencies of the clock signal.

15. The combination as defined in claim 12 wherein the stop control means includes a motor on-off swtich and a time delay circuit coupled between the motor on-off switch and the switch control means for controlling the switch control means to apply the first control signal to control electrode of the switching device of each pair connected to one of the supply conductors and to apply the second control signal to the control electrode of the other switching device of each pair at the end of said preset time after the motor on-off switch has been turned off to thereby disconnect the motor windings from the supply conductors.

16. The combination as defined in claim 12 wherein the switching devices are transistors.

17. The combination as defined in claim 14 wherein the means for supplying direct current voltage across the supply conductors includes a source of direct current voltage and a voltage regulating solid state switch connected in series between the source and the supply conductors, the voltage regulating switch having a control electrode and being arranged to connect the source to the supply conductors in response to the application of a voltage regulating control signal applied to the control electrode, and voltage control means for applying voltage regulating control signals to the control electrode of the voltage regulating switch which have a frequency proportional to the frequency of the clock signal from said clock signal generator and a time duration proportional to the desired torque.

18. The combination as defined in claim 17 wherein the voltage control means includes a torque demand adjustment potentiometer for controlling the time duration of the voltage regulating control signals.

19. The combination as defined in claim 18 wherein the clock signal generator includes a clock frequency potentiometer for controlling the frequency of the clock signals.

20. The combination as defined in claim 19 wherein the means for supplying direct current voltage across the supply conductors is arranged to supply a minimum voltage level across the supply conductors independently of the frequency of the clock signals from said clock signal generator.

21. The combination as defined in claim 20 wherein the stop control means is arranged to inhibit the clock signal generator.

* * * * *